(12) United States Patent
Laming et al.

(10) Patent No.: US 6,334,013 B1
(45) Date of Patent: Dec. 25, 2001

(54) OPTICAL FIBRE GRATINGS

(75) Inventors: Richard Ian Laming, Edinburgh; Morten Ibsen, Hampshire, both of (GB)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/553,483

(22) Filed: Apr. 20, 2000

Related U.S. Application Data

(63) Continuation of application No. PCT/GB98/03173, filed on Oct. 23, 1998.

(30) Foreign Application Priority Data

Oct. 24, 1997 (GB) ................................................ 9722421

(51) Int. Cl.$^7$ ....................................................... G02B 6/34
(52) U.S. Cl. .................................. 385/37; 385/4; 385/10
(58) Field of Search ................................ 385/1, 4, 5, 10, 385/37

(56) References Cited

U.S. PATENT DOCUMENTS

| | | |
|---|---|---|
| 5,666,224 | 9/1997 | Wood et al. . |
| 5,832,154 | 11/1998 | Uetsuka et al. . |
| 5,995,691 * | 11/1999 | Arai et al. ............................. 385/37 |
| 6,072,926 * | 6/2000 | Cole et al. ............................. 385/37 |

FOREIGN PATENT DOCUMENTS

| | | |
|---|---|---|
| 196 34 955 | 8/1997 | (DE) . |
| WO 96/24079 | 8/1996 | (WO) . |
| WO 97/30365 | 8/1997 | (WO) . |

OTHER PUBLICATIONS

S. Legoubin et al., "Formation of Moiré Grating in Core of Germanosilicate Fibre by Transverse Holographic Double Exposure Method", Electronics Letters, vol. 27, No. 21, pp. 1945–1947, (1991).

M. Ibsen et al., "Broadly Tunable DBR Fibre Laser Using Sampled Fibre Bragg Gratings", Electronics Letters, vol. 31, No. 1, pp. 37–38, (1995).

M. Ibsen et al., 30 dB Sampled Gratings in Germanosilicate Planar Waveguides, Electronics Letters, vol. 32, No. 24, pp. 2233–2235, (1996).

M.J. Cole et al., "Moving Fibre/Phase Mask–Scanning Beam Technique for Enhanced Flexibility in Producing Fibre Gratings with Uniform Phase Mask", Electronics Letters, vol. 31, No. 17, pp. 1488–1491, (1995).

(List continued on next page.)

Primary Examiner—John D. Lee
Assistant Examiner—Jennifer Doan
(74) Attorney, Agent, or Firm—Finnegan, Henderson, Farabow, Garrett & Dunner, L.L.P.

(57) ABSTRACT

An optical fiber, a section of length ($L_{gr}$) which is modulated in refractive index so as to form a grating with a plurality of characteristics reflection wavelength channels, has a refractive index modulation comprising an amplitude modulation having an underlaying higher frequency component defining the shape of the reflection profile of each of the wavelength channels and, superposed thereon, a lower frequency component of period P imposing repeated envelopes over the higher frequency component and defining the separation of the wavelength channels. In one embodiment, the lower frequency component has the shape of a sinc-function with varying refractive index ($\delta n$) and with discrete π-phase shifts ($\delta \phi$) each envelope, to form a sinc-sampled grating. Chirped multi-channel optical fiber gratings may thus be provided for dispersion compensation in long-haul transmission links.

8 Claims, 10 Drawing Sheets

OTHER PUBLICATIONS

M.J. Cole et al., "Broadband Dispersion–Compensating Chirped Fibre Bragg Gratings in a 10 Gbit/s NRZ 110 km Non–Dispersion–Shifted Fibre Link Operating at 1.55μm", Electronics Letters, vol. 33, No. 1, pp. 70–71, (1997).

L. Dong et al., "40 Gbit/s 1.55 μm Transmission Over 109 km of Non–Dispersion Shifted Fibre with Long Continuously Chirped Fibre Gratings", OFC'97, PD6, (5 pages) San Jose, USA, (1997).

M. Ibsen et al., Long Continuously Chirped Fibre Bragg Gratings for Compensation of Linear–And $3^{rd}$ Order–Dispersion, ECOC'97 Eindburgh 22–25, pp. 49–52, (1997).

B.J. Eggleton et al., "Long Periodic Superstructure Bragg Gratings in Optical Fibres", Electronic Letters, vol. 30, No. 19, pp. 1620–1622, (1994).

D.C. Reid et al., "Phase–Shifted Moiré Grating Fibre Resonators", Electronic Letters, vol. 36, No. 1, pp. 10–12, (1990).

F. Ouellette et al., "Broadband and WDM Dispersion Compensation using Chirped Sampled Fibre Bragg Gratings", Electronic Letters, vol. 31, No. 11, pp. 899–901, (1995).

* cited by examiner

OPTICAL FIBRE GRATINGS

This application is a continuation of International Application No. PCT/GB98/03173, filed Oct. 23, 1998, the content of which is incorporated herein by reference.

BACKGROUND OF THE INVENTION

This invention relates to optical fibre gratings.

To allow a high rate of data transmission through existing fibre links which are inherently dispersive, it is necessary to provide some means for dispersion compensation, such as chirped fibre gratings.

Chirped gratings are gratings in which the Bragg wavelength varies along the length of the grating, in contrast to conventional non-chirped gratings which are characterised by a single resonant wavelength (the Bragg wavelength) defined by a single grating pitch. The fact that a chirped grating reflects light of different wavelengths at different positions along its length can be exploited to provide a dispersion compensator.

For dispersion compensation of wavelength division multiplexed (WDM) signals, multi-channel chirped gratings can be used. Multi-channel chirped gratings have been realised using sampled gratings (see Ouellette et al, Electronics Letters, Volume 31, pages 899–900 (1995)). Sampled waveguide gratings are gratings in which one or both of the amplitude and phase of the refractive index modulation is itself modulated periodically in a binary (two-state) manner along the structure. In use, such a grating provides multiple reflection peaks separated by a wavelength defined by the amplitude and/or phase modulation, the multiple reflection peaks being distributed around a central Bragg wavelength of the sampled waveguide grating.

The individual channels of a multi-channel grating may be chirped to provide a multi-channel dispersion compensator. Multi-channel gratings also have other applications, for example when not chirped as optical filters and pulse shapers of WDM signals.

One kind of multi-channel grating is a Moiré grating which can be considered as a superposition of two Bragg gratings of different pitch. Moiré fibre gratings have been realised as reported by Reid et al in Electronics Letters, Volume 26, pages 10–12 (1990) and by Legoubin et al in Electronics Letters, Volume 27, pages 1945–1946 (1991).

Reid et al report a single-mode fibre which is lapped and polished to gain access to the field in the core and then coated with a thin layer of photoresist. A Moiré grating is formed in the photoresist by a double exposure to interference patterns of slightly different period. After developing the photo-resist, the grating is etched and then coated with a layer of aluminium oxide and finally covered with an index-matching oil.

Legoubin et al report writing a Moiré grating into a germanosilicate (Ge/Si) fibre using double-exposure by ultra-violet fringe patterns. An alternative reported technique is to etch a Moiré pattern into a phase mask substrate, so providing a bespoke phase mask for that Moiré pattern.

The distinction between the channels in these previously-realised Moiré fibre gratings lacks clarity, and chirping of the structure has not been reported or even considered possible.

SUMMARY OF THE INVENTION

According to a first aspect of the invention there is provided an optical fibre waveguide a section of which is modulated in refractive index so as to form a grating with a plurality of characteristic reflection wavelength channels, in which the refractive index modulation comprises an amplitude modulation having:

an underlying higher frequency component defining the shape of the reflection profile of each of the wavelength channels;

a lower frequency component imposing repeated envelopes over the higher frequency component and defining the separation of the wavelength channels, the envelope shape of the lower frequency component being such as to impart a substantially even response to each of the wavelength channels; and discrete phase shifts at least between the envelopes of the lower frequency component.

The invention therefore provides a multi-channel fibre grating using a repetitive structure in which repeated envelopes are imposed on a higher frequency component. The higher frequency component, which may be of single frequency or chirped, defines the centre frequency of the multi-channel grating and also the general response of each channel. The lower frequency component defines the channel separation, either even or uneven depending on the function chosen, and also the relative strengths of the individual channels. In this way, the invention can overcome the problems with previous sampled gratings using a binary or top-hat sampling function where the relative strengths of the different channels were very uneven.

The higher frequency component defines the centre frequency of the system. So, in a grating having an odd number of channels this may well coincide with a centre frequency of the centre channel. In a grating with an even number of channels this centre frequency may well fall between two adjacent channels.

In some other embodiments, the lower frequency component conforms to a sinc-function, to form a sinc-sampled grating. This will have a generally symmetrical envelope shape and will lead to the plurality of channels having a substantially equal separation. However, other envelope shapes formed by the addition of different frequency components can be used—these can be arranged to give the plurality of channels an unequal separation.

A non-chirped multi-channel grating may be provided in which the higher frequency component has a single frequency. Alternatively a chirped multi-channel grating may be provided in which the higher frequency component has a varying frequency along the modulated section to define a chirped grating.

By inclusion of discrete phase shifts, it can be ensured that a continuously alternating refractive index amplitude and phase profile is provided. For this purpose, the discrete phase shifts may be substantially pi, i.e. 180 degrees, in magnitude. The phase shifts are preferably at each zero crossing of the lower frequency component.

The above is more attractive than refractive index modulations which it is possible to produce by over-writing many gratings at different wavelengths in the same section of waveguide, since through the provision of an envelope and discrete phase shifts therebetween exact wavelength matching of the channels is automatically achieved from the sampling process. Moreover, the time taken to write the grating can be reduced considerably. Moreover, by writing the gratings onto a single length of waveguide the gratings can offer the potential of higher stability when packaged as well as cost advantages.

In one application, a dispersion compensator is provided for dispersion compensation in data transmission links, the compensator having an optical waveguide grating which is a chirped two-channel grating, each channel having independent dispersion compensation for the wavelength channel concerned, in which the grating is defined by a refractive index modulation profile including discrete phase changes present on a single section of the waveguiding structure. Clear separation between wavelength channels is achievable to provide dual channel dispersion compensators with a dispersion-bandwidth product twice that of a single channel grating written into the equivalent length of fibre.

In another application, a dispersion compensator is provided for dispersion compensation in data transmission links, the compensator having an optical waveguide grating which is a chirped sampled grating, for example a sinc-sampled grating, having two or more wavelength channels each with independent dispersion compensation for the wavelength channel concerned, in which the sampled grating is defined by a refractive index modulation profile including discrete phase changes.

As well as sine and sinc functions, the envelope imposed on the usual refractive index modulation may follow any desired functional form having appropriate Fourier properties for the application concerned to provide a multi-channel grating with desired reflection characteristics.

Other embodiments with non-chirped gratings may also be realised.

In the above-mentioned embodiments, the grating may be manufactured by impressing simultaneously on the waveguiding structure the pre-calculated refractive index profile using a continuous writing technique, for example to provide a precise and equal wavelength separation between the wavelength channels which can be chosen to correspond precisely to the wavelength channels of a WDM transmission system having two or more equally-spaced wavelength channels.

The optical waveguide grating can be formed in an optical fibre comprising in cross-section a core region and a cladding region, the modulated section being defined in the core region or a part thereof, such as an annular region disposed around a central core region.

Further aspects of the invention are exemplified by the attached claims.

BRIEF DESCRIPTION OF THE DRAWINGS

For a better understanding of the invention and to show how the same may be carried into effect reference is now made by way of example to the accompanying drawings in which.

DETAILED DESCRIPTION OF THE PREFERRED EMBODIMENTS

Figure 1:
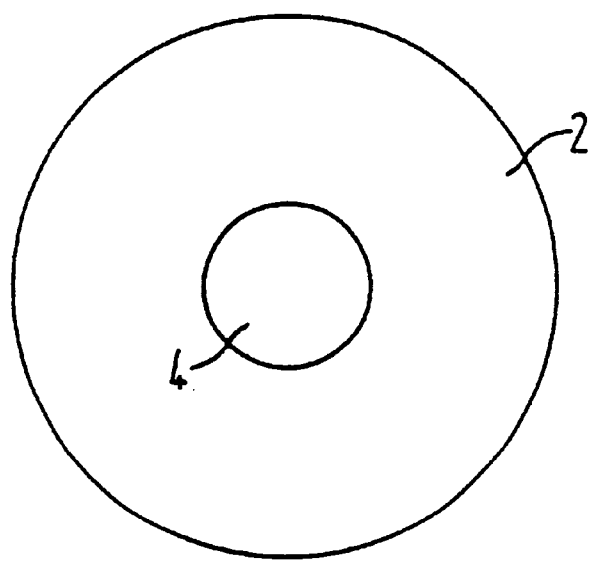
FIG. 1 shows schematically in cross-section an optical fibre waveguide grating according to a first embodiment of the invention.
Figure 2:
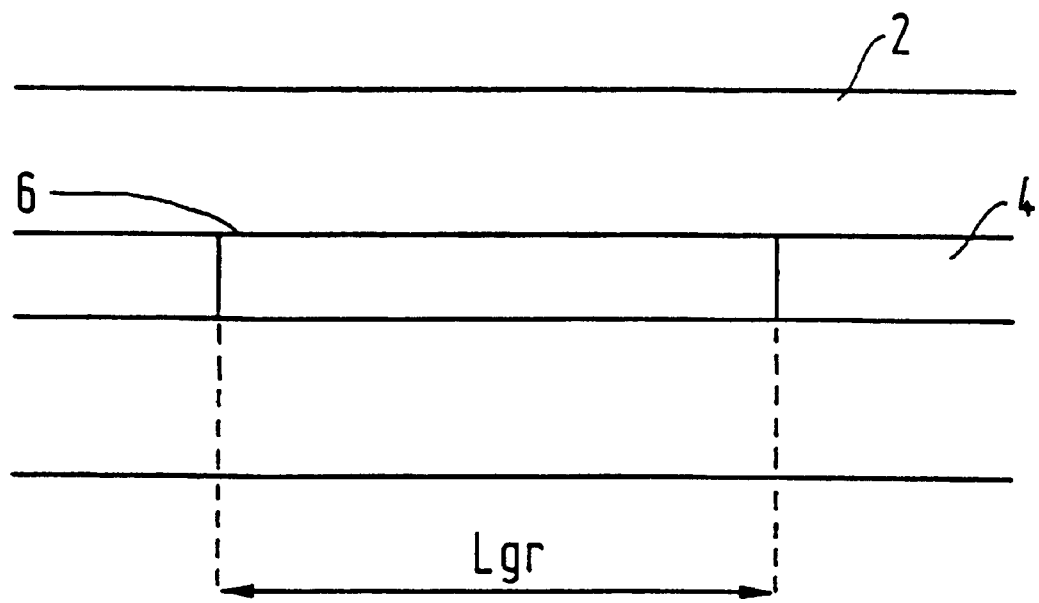
FIG. 2 shows in axial-section the optical fibre waveguide grating of FIG. 1.

FIGS. 1 and 2 show in cross-section and axial-section respectively a multi-channel grating according to a first embodiment of the invention realised in an optical fibre. The optical fibre comprises a glass cladding 2 and a photosensitive light-guiding core 4. The fibre may, for example, be a deuterium-loaded Ge/Si fibre. There is provided a section 6 of the fibre core 4 having a length $L_{gr}$. The section 6 has a modulated refractive index profile and phase profile. The modulation provides a multi-channel grating. The length $L_{gr}$ of the modulated portion 6 of the core 4 is, in typical examples, of the order of ten centimeters to one meter.

EXAMPLE 1

Example 1 is now described with reference to FIGS. 3 and 4.

A four-channel non-chirped sampled fibre grating is made using an extended version of the scanning fibre/phase mask continuous grating technique described in GB-A-2 316 760. This technique allows non-uniform grating formation with a uniform phase mask. An intracavity frequency-doubled argon ion laser producing 100 mW of 244 nm CW light is employed as a UV source. A total fluence of ~0.8 kJ/cm² is used to write the grating. The grating is written in a deuterium loaded germanosilicate (Ge/Si) fibre of the kind shown schematically in FIGS. 1 and 2 and having a numerical aperture NA~0.2. In order to smooth out the time delay ripples, the grating is apodised over 10% of the total grating length at either end of the grating.

The time taken to write the grating of this example was 30 minutes and the grating is 10 cm in length.

Figure 3:
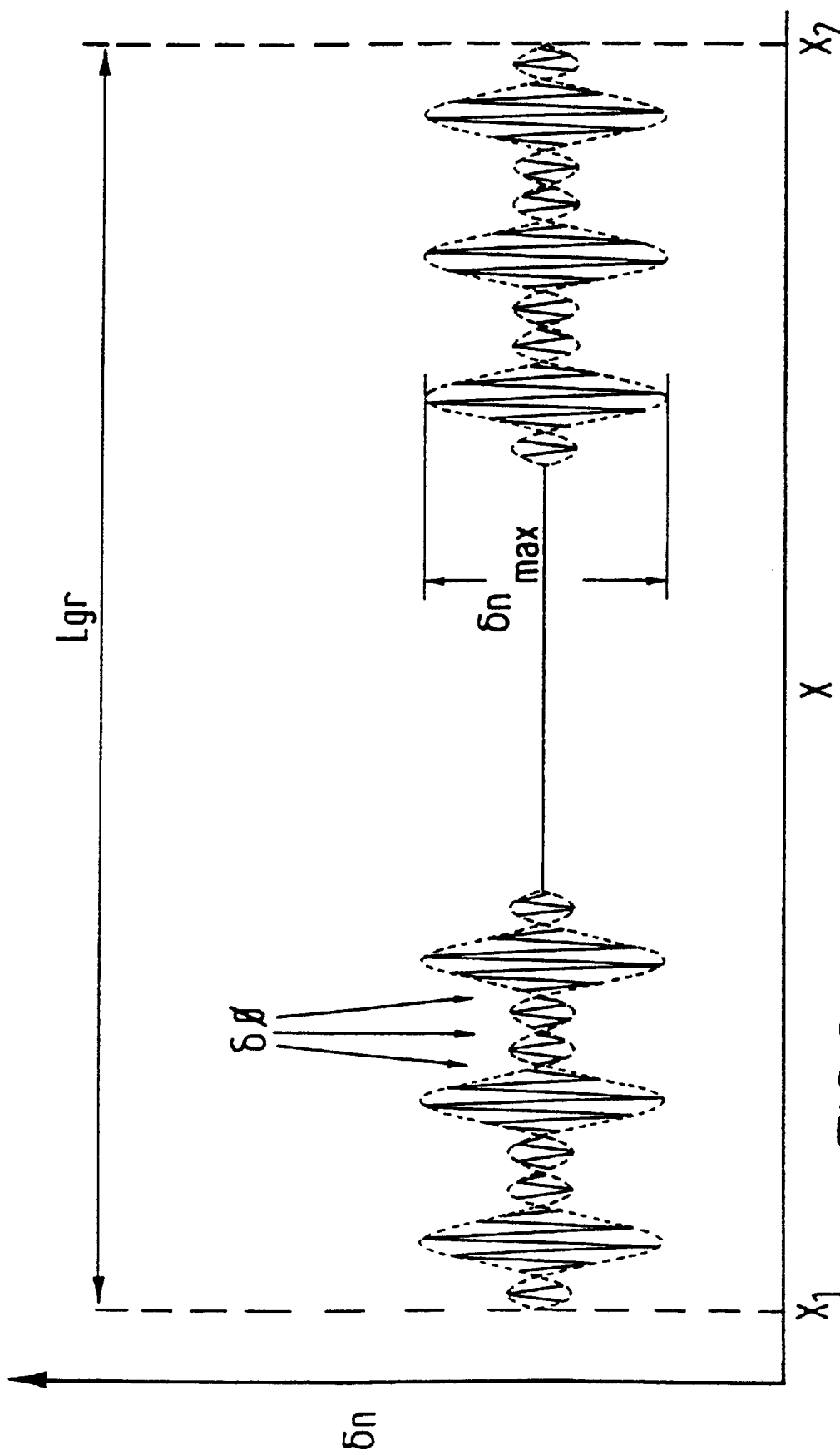
FIG. 3 is a graph showing the refractive index profile $\delta n$ as a function of distance x along a transmission direction of a four-channel sinc-sampled waveguide grating of a first example.

FIG. 3 shows the complex refractive index profile and the regions of phase shift in the grating of Example 1. The profile conforms to a sinc-function. The sinc-shaped sampling sections cause the overall envelope of the reflection spectrum to be square or flat-topped. Furthermore, the grating is made up of a number of concatenated sub-sections to ensure a continuously alternating refractive index amplitude and phase profile. The concatenated sub-sections each have the same, or substantially the same, refractive index and phase profile to create a plurality of wavelength channels within the overall envelope. The channel separation $\Delta\lambda$ is defined by the envelope period P between the maxima of the longer frequency refractive index amplitude modulation, namely by $$\Delta\lambda = \lambda_B^2 / 2n_{eff} P \quad (1)$$

where $n_{eff}$ is the effective refractive index in the grating and $\lambda_B$ is the Bragg wavelength of the grating. As shown in FIG. 3, the amplitude modulation has a maximum of $\delta n_{max}$.

The refractive index profile may be expressed as the sum of the spectral components from each of the characteristic wavelengths. Fourier theory can be used to express the refractive index profile as a single sampling function $\Sigma(z)$, where z is the length axis along the propagation direction in the waveguiding structure, namely:

$$\sum(z) = \frac{\sin\left(N \cdot \frac{L_{gr}}{P} \cdot \pi \cdot \left(z + \frac{P}{2 \cdot L_{gr}}\right)\right)}{N \cdot \sin\left(\frac{L_{gr}}{P} \cdot \pi \cdot \left(z + \frac{P}{2 \cdot L_{gr}}\right)\right)} \cdot 0 \leq z \leq 1$$

where N is the number of wavelength channels (an integer, greater than one) and $L_{gr}$ is the total length of the grating.

Referring back to FIG. 3, it can be seen that the refractive index profile has two side lobes between successive maxima. Generally, the number of side lobes between successive maxima is two less than the number of characteristic wavelengths. For example, an eight-channel grating has a refractive index profile with six side lobes, a sixteen-channel grating, fourteen side lobes and so forth. The sinc-shape of the refractive index modulation is generated using apodisation along the length of the grating. In order to create the sign change in the refractive index profile between the side lobes a discrete phase shift $\delta\phi$ of $\pi$ (pi) is inserted.

Figure 4:
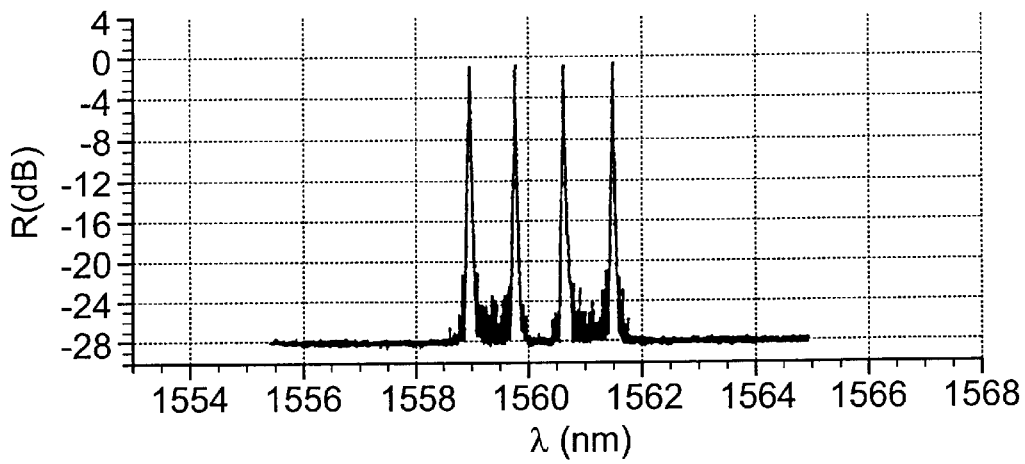
FIG. 4 shows the relative reflectivity R in decibels as a function of wavelength $\lambda$ in nanometers for the grating of FIG. 3.

FIG. 4 shows the reflectivity R of the grating of FIG. 1 as a function of wavelength $\lambda$. The sampled grating has a Bragg wavelength of 1560.5 nm and has four wavelength channels. All the wavelength channels have complete out-of-band wavelength suppression as evidenced by FIG. 4. All wavelength channels exhibit near-identical characteristics, being uniform with a 16 pm bandwidth and approximately 10 dB of transmission loss. The channel separation is 100 GHz, giving a finesse (ratio of the separation of adjacent channel maxima to the half width of a channel maximum) of 50.

EXAMPLE 2

Figure 5:
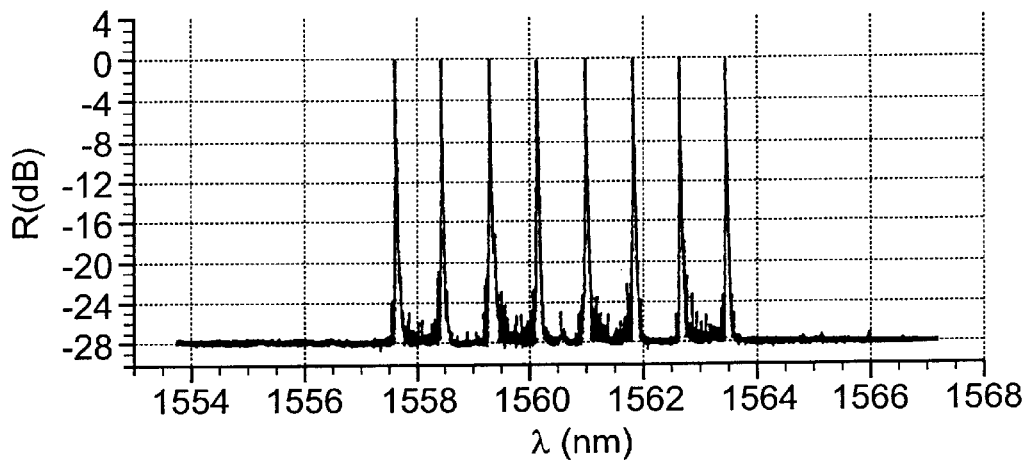
FIG. 5 shows the reflectivity R in decibels as a function of wavelength $\lambda$ in nanometers for an eight channel grating according to a second example.

An eight-channel non-chirped sampled fibre grating is made with the same technique referred to in Example 1 and written onto a 10 cm long portion of a Ge/Si fibre with NA~0.2, also as in Example 1. The refractive index profile has a sinc-shaped profile analysable with the same application of Fourier theory as described with reference to Example 1. The eight wavelength channels all have complete out-of-band wavelength suppression as evidenced by FIG. 5, which shows the reflectivity R of the grating as a function of wavelength $\lambda$. The channels are distributed about the central Bragg wavelength of 1560.5 nm defined by the underlying uniform grating pitch and all have near-identical characteristics, being uniform with a 16 pm bandwidth and approximately 10 dB transmission loss. The channel separation is 100 GHz giving a finesse of 50.

EXAMPLE 3

Figure 6:
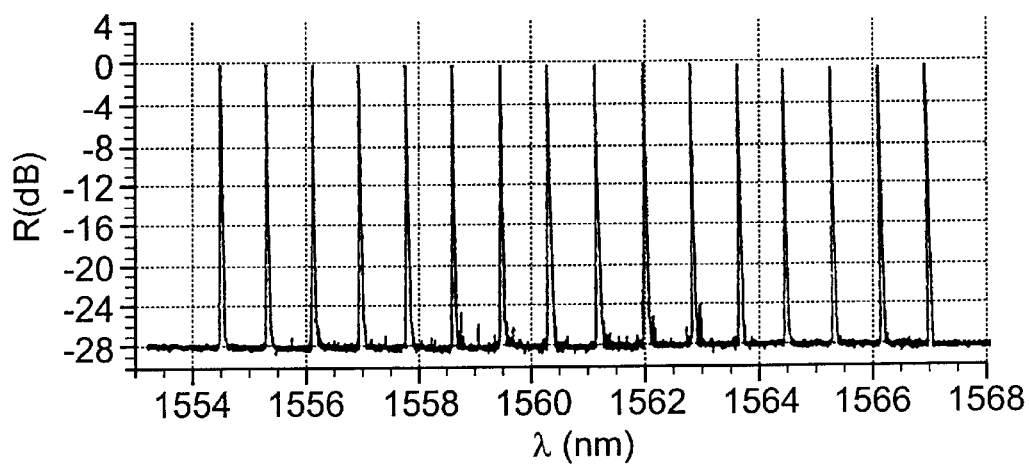
FIG. 6 shows the reflectivity R in decibels as a function of wavelength $\lambda$ in nanometers for a sixteen channel grating according to a third example.

A sixteen-channel non-chirped sampled fibre grating is made with the same technique referred to in Example 1 and written onto a 10 cm long portion of a Ge/Si fibre with NA~0.2, also as in Example 1. The time taken to write the sampled grating was 15 minutes and the refractive index change approximately $2 \times 10^{-4}$. The refractive index profile has a sinc-shaped profile analysable with the same application of Fourier theory as described with reference to Example 1. The sixteen wavelength channels all have complete out-of-band wavelength suppression as evidenced by FIG. 6, which shows the reflectivity R of the grating as a function of wavelength $\lambda$. The channels are distributed about a central Bragg wavelength of 1560.5 nm defined by the underlying uniform grating pitch and all have identical characteristics, being uniform with a 16 pm bandwidth and approximately 10 dB transmission loss. The channel separation is 100 GHz giving a finesse of 50.

EXAMPLE 4

Example 4 is now described with reference to FIGS. 7 to 11.

A two-channel chirped fibre grating is provided. The grating was made using a similar technique as referred to in Example 1, but modified so that the underlying period of the modulation used to define the individual wavelength channels is varied continuously along the written portion of the Ge/Si fibre. Preferably the period variation along the length of the grating is monotonic and linear, giving a linearly chirped grating. The fibre has a NA~0.2 as in Example 1. The time taken to write the grating was 30 minutes. In order to smooth out the time delay ripples, the gratings are apodised over 10% of the total grating length at either end of the grating.

The Bragg wavelength of the grating is 1531.9 nm and the grating has a refractive index modulation period of 291 $\mu$m leading to a wavelength separation of the two reflection channels of 2.7 nm (338 GHz). The bandwidth of each channel is identical, being approximately 2.7 nm. These values are derived by a simple application of equation (1) above.

Figure 7:
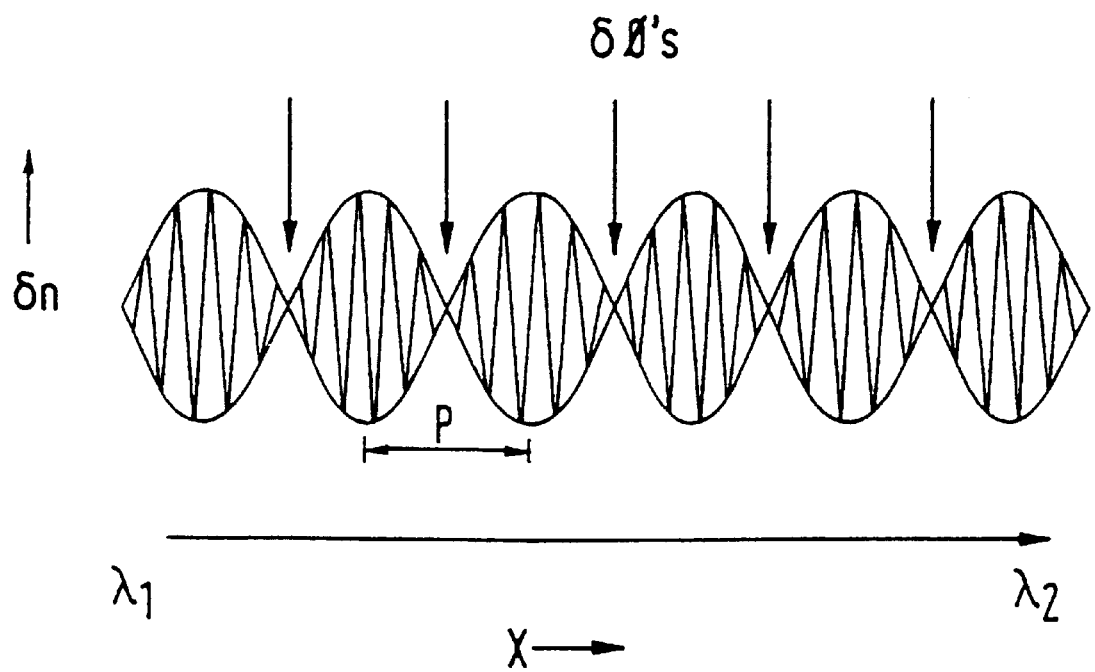
FIG. 7 is a graph showing the refractive index profile $\delta n$ as a function of distance x along a transmission direction of a two-channel Moiré grating of a fourth example.
Figure 8:
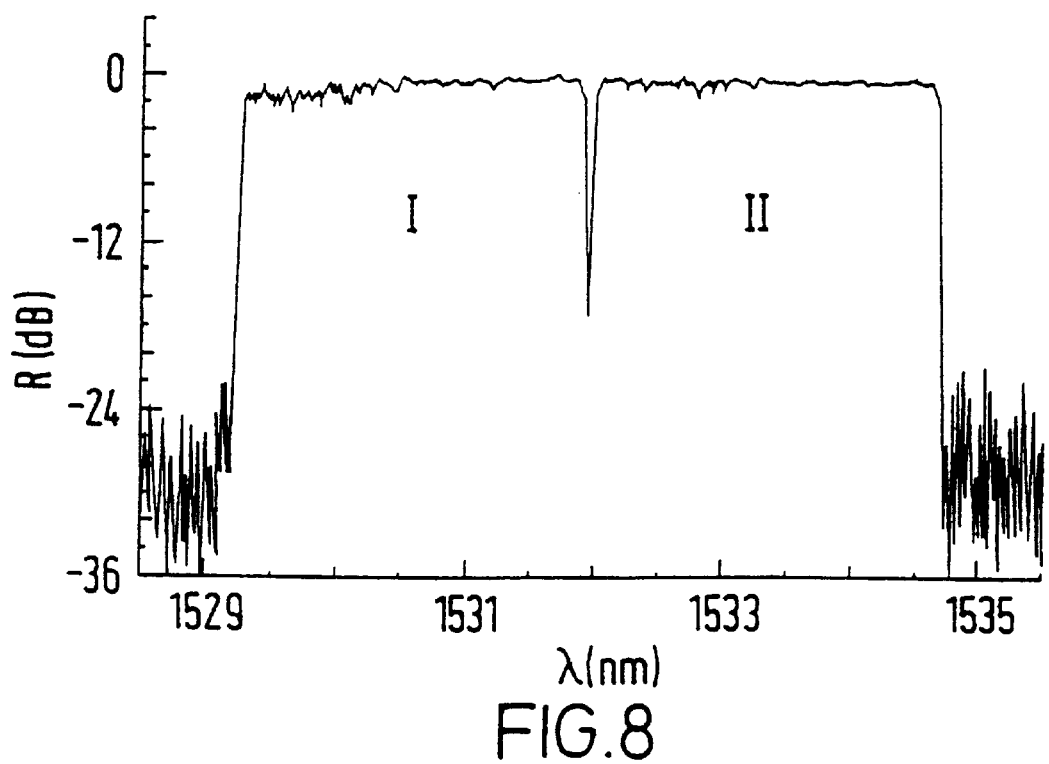
FIG. 8 shows the reflectivity R in decibels as a function of wavelength $\lambda$ in nanometers for the grating of FIG. 7.
Figure 9:
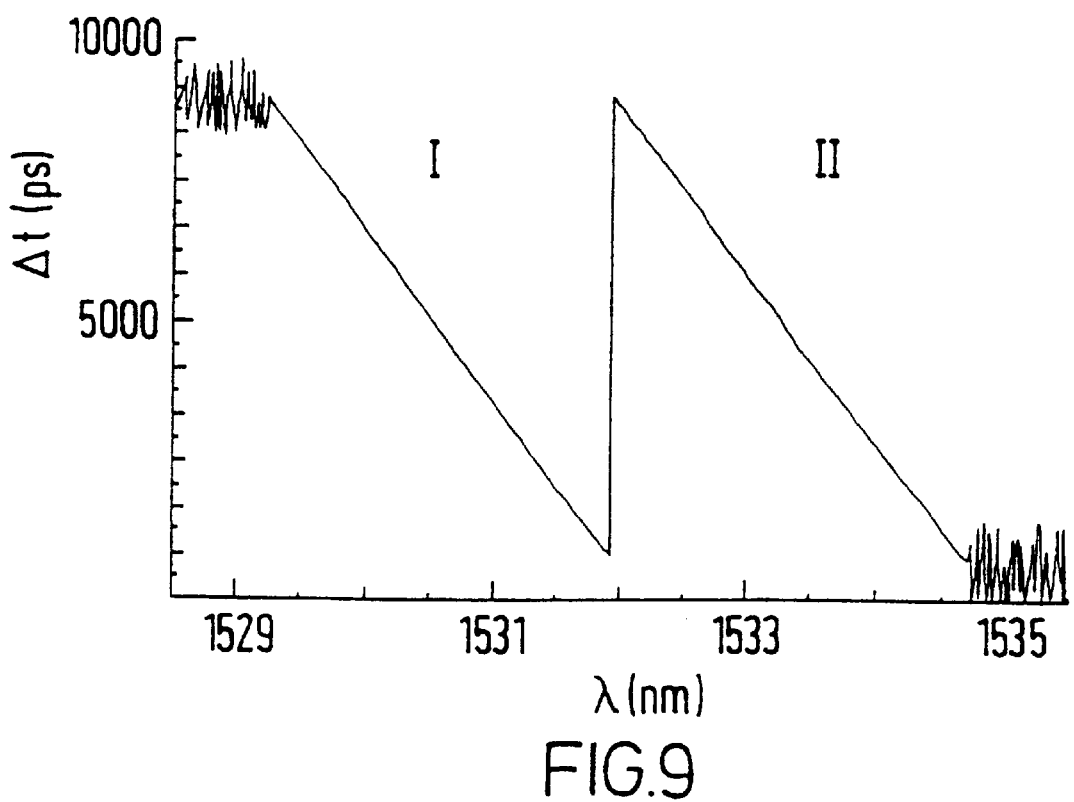
FIG. 9 shows the time delay $\Delta t$ in picoseconds as a function of wavelength $\lambda$ in nanometers for the grating of FIG. 7.
Figure 10:
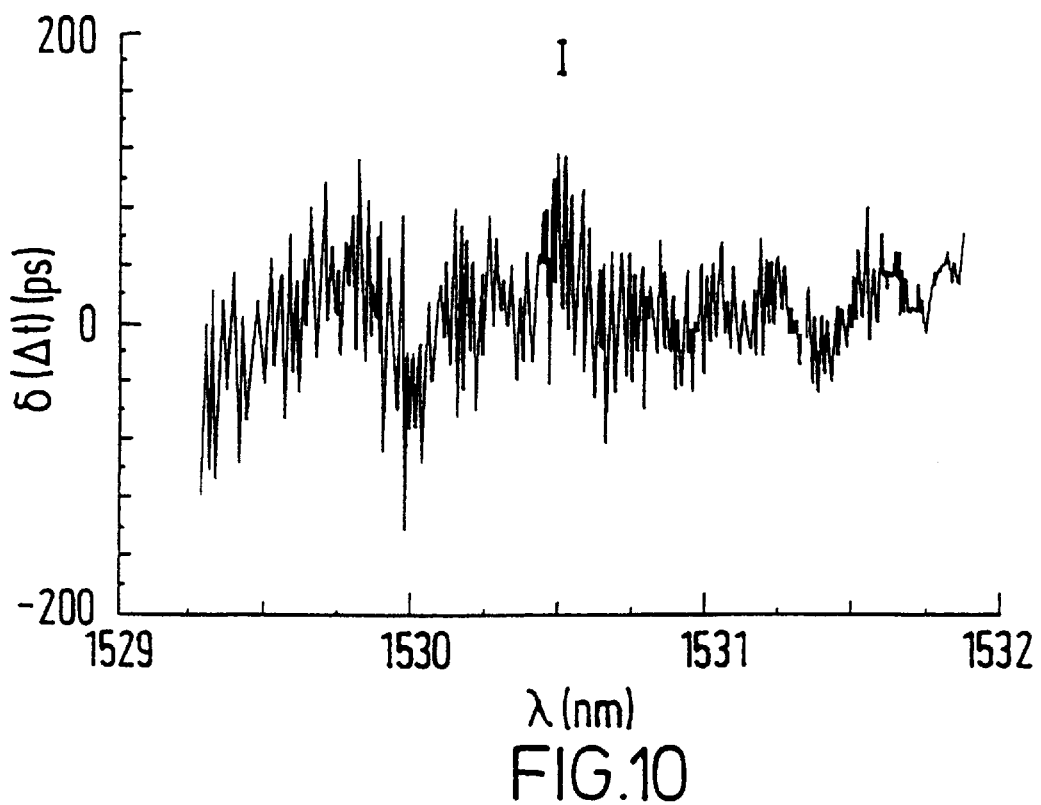
FIG. 10 shows the deviation from linear time delay $\delta(\Delta t)$ in picoseconds for channel I of the grating of FIG. 7.
Figure 11:
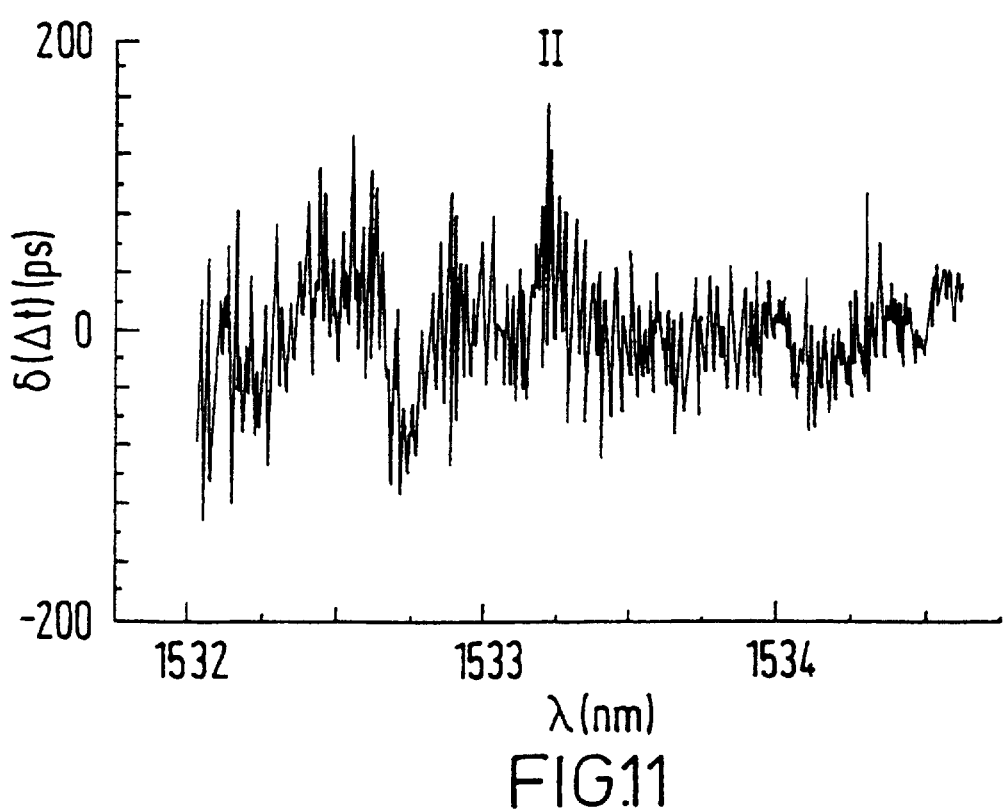
FIG. 11 shows the deviation from linear time delay $\delta(\Delta t)$ in picoseconds for channel II of the grating of FIG. 7.

FIG. 7 shows the complex refractive index profile and the regions of phase shift in the grating of Example 4. The profile conforms to a sine-function and results in two characteristic reflection channels. This follows from Fourier theory which shows that a sinusoidal variation in refractive index of a grating will generate two identical side-bands disposed symmetrically about the Bragg wavelength $\lambda_B$ of the grating. The sinusoidal variation implies that regions of "negative" refractive index are necessary. The desired effect is realised by inserting a discrete phase shift δφ of π (pi) after each half-period of the sine variation in the refractive index amplitude, as can be seen from FIG. 7. The separation Δλ between the two wavelengths is defined by the period P between the maxima of the refractive index modulation and equation (1) above.

A linear chirp is imposed on the grating as indicated in FIG. 7 by the arrow pointing from a relatively short wavelengths $\lambda_1$ characteristic of the grating at one end of the modulated section of waveguide and a relatively long wavelength $\lambda_2$ characteristic of the grating at the other end of the modulated section of waveguide.

Inaccuracies in the magnitude of the phase shift between the modulation sections will disturb the coherent picture of the sinusoidal refractive index profile. Side-bands of unequal strength will be generated outside the two centre side-bands and will disturb the coupling coefficient in each of these, hence causing non-identical dispersions and bandwidths.

FIGS. 8 to 11 show the reflection and time delay of the two channels I and II in a 1 m long continuously chirped Moiré grating designed to compensate 200 km dispersion in a fibre with a dispersion of 17 ps/nm/km. The grating characterisation for reflectivity and time delay was carried out with a wavelength resolution on 2 pm using a tuneable laser and high precision wavemeter. Each of the two channels experience a total time delay of 9672 ps. Channel I has a dispersion of 3630 ps/nm. Channel II has a dispersion of 3607 ps/nm. The dispersion is defined by the length of the grating and the channel bandwidth. The grating was also tested in transmission and each dispersion channel showed a transmission loss of approximately 10 dB indicating a reflectivity of approximately 90%. A scan of wavelengths well out of band of the gratings show that no wavelengths other than the two produced by the superstructure are evident.

As is evident from FIGS. 8 to 11, the two channels I and II are near identical in terms of reflectivity and time delay, but Channel I is the weaker. This is due to cladding-mode loss generated by Channel II.

The characteristics shown in FIGS. 8 to 11 demonstrate the high degree of control over the grating parameters which is available, as evidenced by the lack of artefacts which would exist if there were any significant errors in the magnitude of the phase shifts between the modulation sections.

EXAMPLE 5

A two-channel chirped fibre grating is made with the same technique referred to in Example 4 and written into a portion of deuterium-loaded Ge/Si fibre with an NA~0.2, also as in Example 4. The length of the modulated portion is 35.1 cm.

Figure 12:
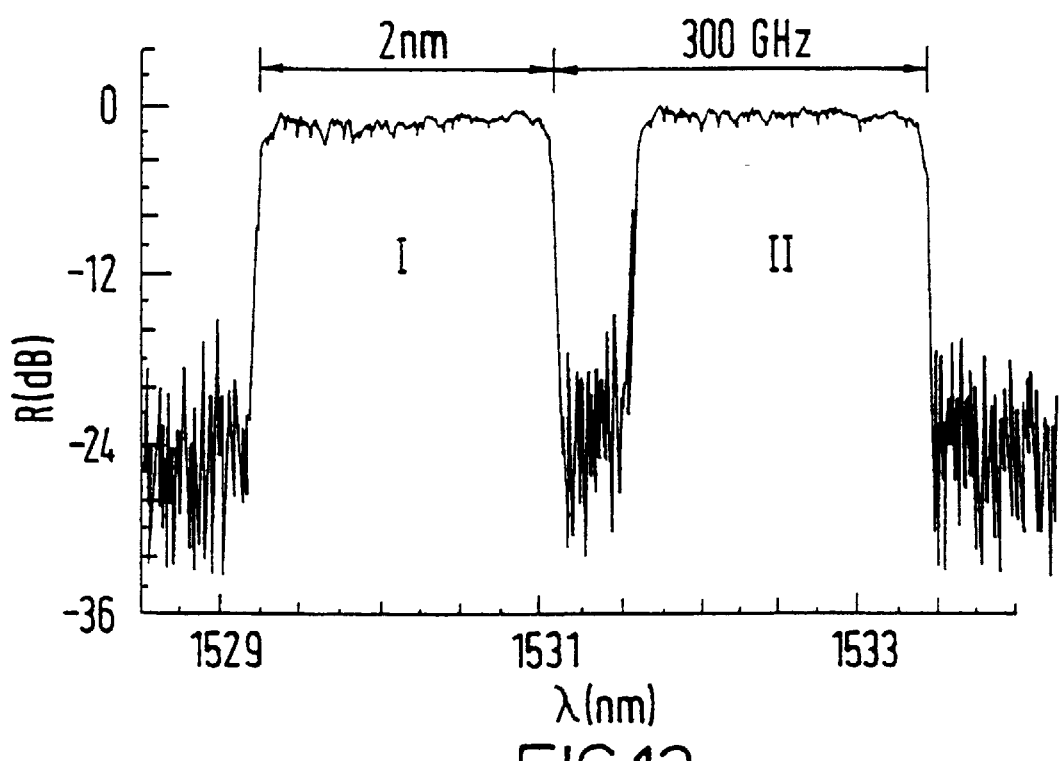
FIG. 12 shows the reflectivity R in decibels as a function of wavelength $\lambda$ in nanometers for a two-channel Moiré grating according to a fifth example.
Figure 13:
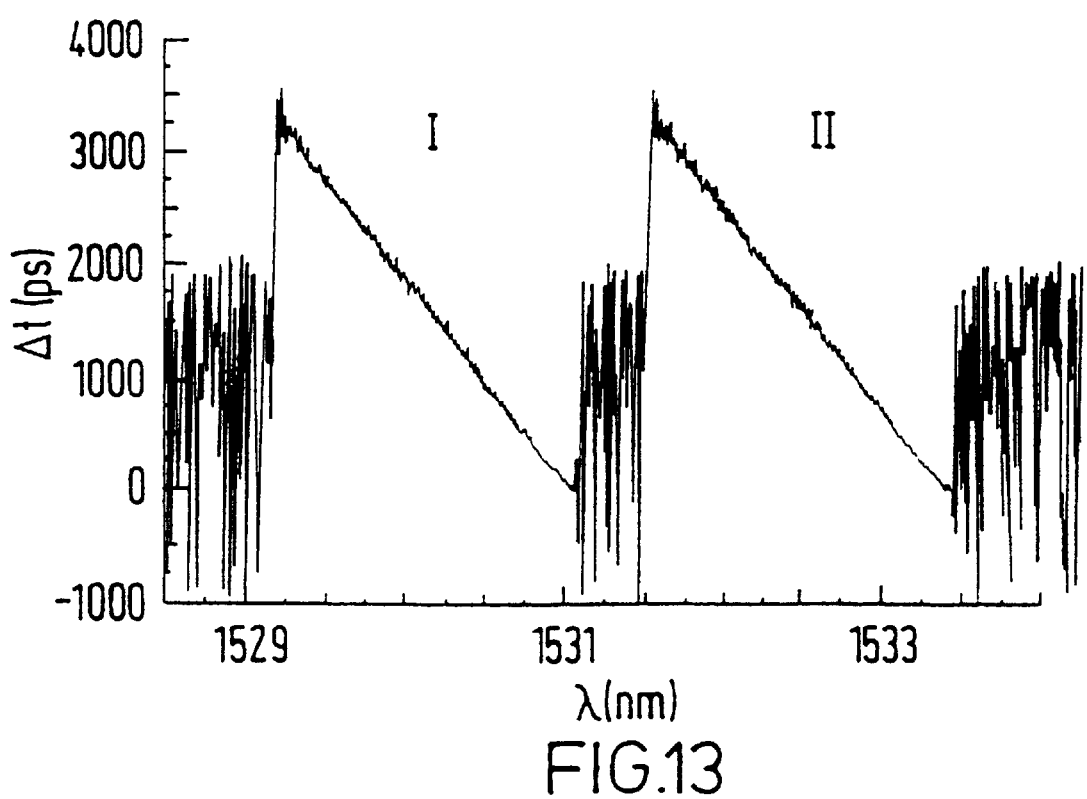
FIG. 13 shows the time delay $\Delta t$ in picoseconds as a function of wavelength in nanometers for the grating of FIG. 12.

FIGS. 12 and 13 show the 35.1 cm long chirped Moiré grating, which is designed to compensate 100 km of dispersion in standard fibre. The grating has a channel separation of 2.4 nm (300 GHz) and each of the two wavelength channels has a bandwidth of approximately 2 nm. This yields a dispersion of ~1770 ps/nm for each channel. Each channel exhibits a transmission loss of ~8 dB, indicating a reflectivity of approximately 84%. A scan of wavelengths well out of band of the gratings show that no wavelengths other than the two produced by the superstructure are evident.

From FIGS. 12 and 13 it can be seen that the two channels are nearly identical in terms of reflectivity and time delay.

Channel I is the weaker. This is due to cladding-mode loss generated by channel II.

The characteristics shown in FIGS. 12 and 13 demonstrate the high degree of control of the grating parameters which is available.

EXAMPLE 6

A four-channel chirped fibre grating is made with the same technique referred to in Example 4 and written into a portion of deuterium-loaded Ge/Si fibre with an NA~0.2, also as in Example 4. The modulated portion has a length of 22.5 cm.

Figure 14:
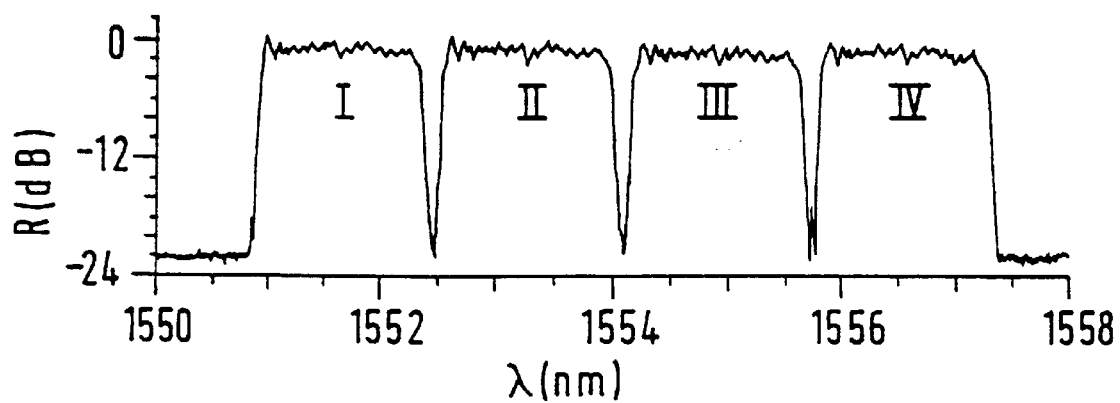
FIG. 14 shows the reflectivity R in decibels as a function of wavelength $\lambda$ in nanometers of a four-channel chirped sinc-sampled grating according to a sixth example.
Figure 15:
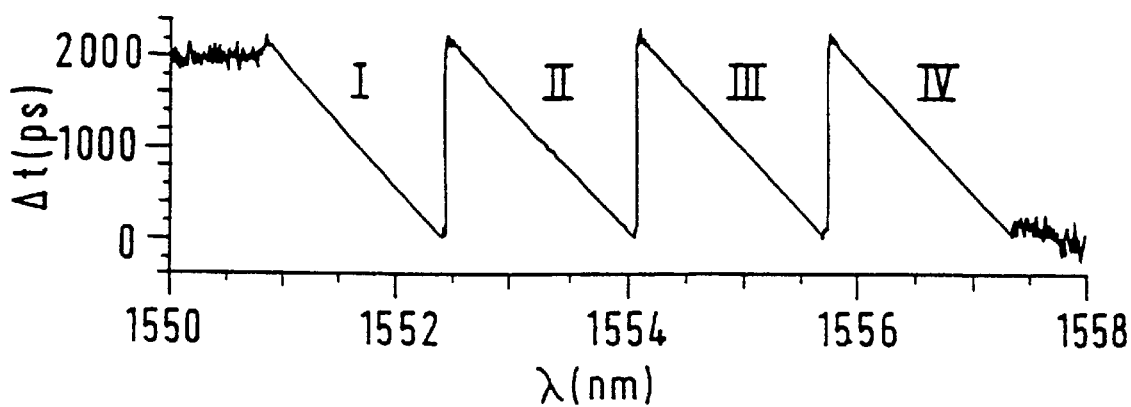
FIG. 15 shows the time delay $\Delta t$ in picoseconds as a function of wavelength $\lambda$ in nanometers for the four-channel chirped grating of FIG. 14.
Figure 16:
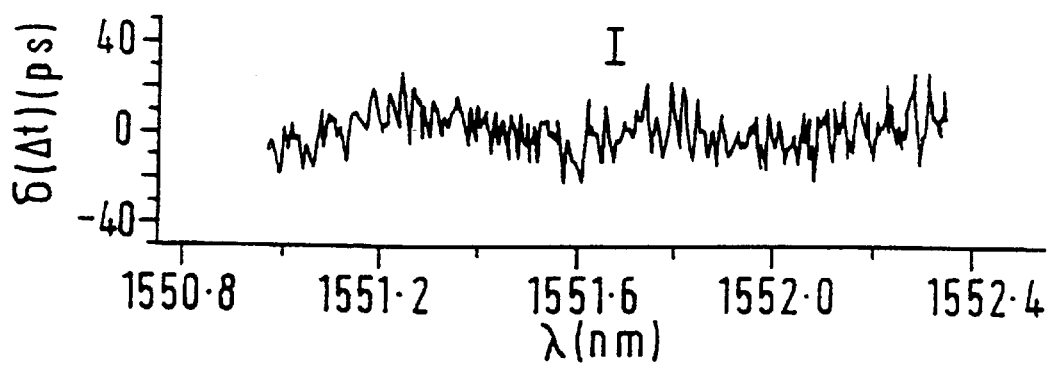
FIGS. 16 to 19 show the deviation from a linear time delay $\delta(\Delta t)$ in picoseconds as a function of wavelength $\lambda$ in nanometers for the four channels I–IV of the grating of FIG. 14.
Figure 17:
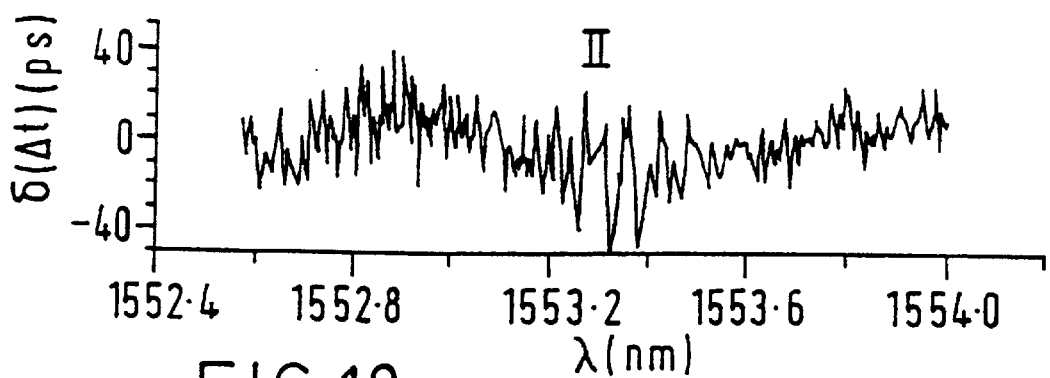
Figure 18:
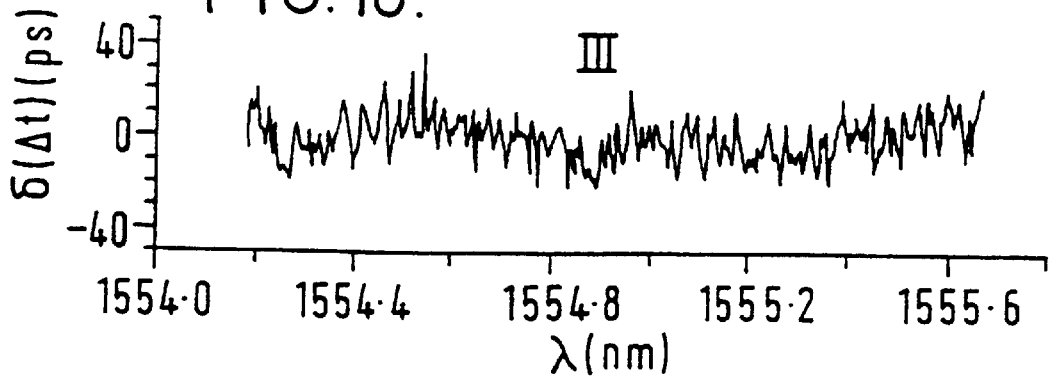
Figure 19:
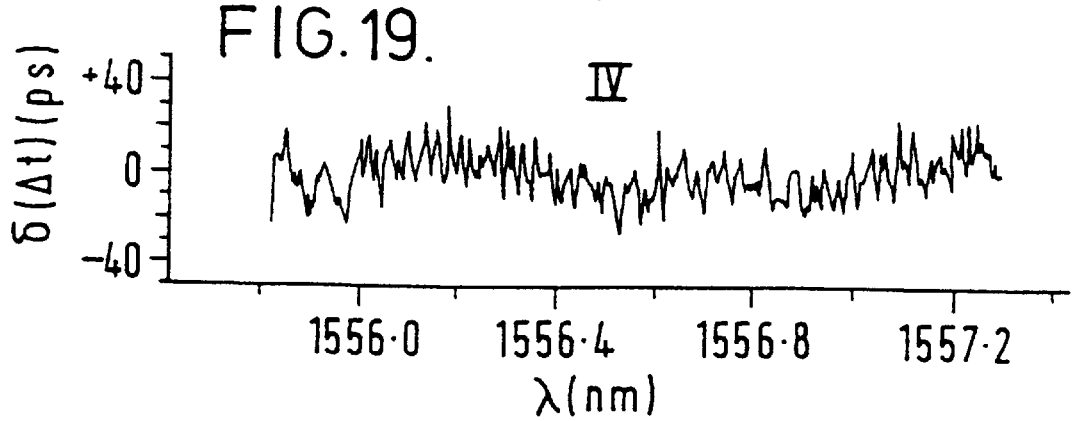

FIGS. 14 and 15 show the measured reflection and time delay characteristics of the continuously chirped fibre grating. The four wavelength channels are separated by 1.6 nm (200 GHz) and have channel bandwidths of 1.6 nm. FIGS. 15 to 18 show the measured deviations from linear time delay for channels I, II, III and IV respectively, as shown in FIGS. 14 and 15.

The grating is a chirped sinc-sampled fibre grating with a Bragg wavelength of 1554 nm and length of 22.5 cm. The channel bandwidths are each ~200 GHz. In order to generate this channel separation, a sampling period P of 521 μm is used. The resultant average dispersions of the four channels are:

$D_I$=−1410 ps/nm $D_{II}$=−1406 ps/nm $D_{III}$=−1392 ps/nm $D_{IV}$=−1392 ps/nm.

To reduce the ripple in the dispersion characteristics, the grating is apodised over 10% of the total grating length at either end using cosine apodisation. The resultant deviations from linear time delay is 30 ps peak-to-peak (see FIGS. 16 to 19). Each channel exhibits a transmission loss of ~8 dB, indicating a reflectivity of approximately 84%. The grating was tested for reflectivity, as shown in FIG. 14, with a wavelength resolution of 1 pm using a tuneable laser and measuring the group delay between successive wavelength steps on a network analyser. The modulation frequency used is 500 MHz.

The device of this example is relatively simple to fabricate to specification, cheap to manufacture and stable when packaged. The wavelength separations are very accurate. The four channels are nearly identical in terms of reflectivity and time delay as evidenced by FIGS. 14 to 19. The wavelength channels have a spectral response devoid of out-of-band wavelength channels as evidenced by FIG. 14.

Devices comprising gratings according to any one of Examples 1 to 6 benefit from the fact that multiple channels are written into the same, relatively short length of fibre. The length is 10 cm in the case of Examples 1 to 3, 1 m in the case of Example 4, 35.1 cm in the case of Example 5 and 22.5 cm in the case of Example 6. The comparatively short length of waveguiding material needed, be it fibre or solid state, reduces packaging and temperature stabilisation demands in comparison to devices based on writing gratings for each wavelength channel in series along the waveguide. Moreover, because of the fact that a single refractive index profile generates all the wavelength channels, very accurate and precise wavelength separation is achievable. Stitching errors are avoided altogether, since the multiple channels are defined by a single refractive index profile and/or phase profile which is pre-computed and then written onto the waveguide in a single step. In order to smooth out time delay ripples, the gratings can be apodised at their ends, for example over 10% of the total grating length at either end.

The characteristics of several reflection wavelength gratings can thus embodied in a single refractive index profile. for example, which can be written into a single portion of waveguide. Expensive problems resulting from the implementation of several gratings either in series or on different ports of a circulator can thus be avoided. The characteristics shown in the above examples show the high degree of control over the grating parameters which is available, as evidenced by the lack of artefacts which would exist if there were any significant errors in the magnitude of the phase shifts between the modulation sections. In all the above Examples, the channels are shown to exhibit identical or near-identical characteristics and out-of-band wavelengths are completely or nearly completely suppressed.

Moreover, as shown in Examples 4 to 6, devices can be provided for WDM dispersion compensation with highly uniform chirping in each of a plurality of the wavelength channels.

In the above examples, the high degree of conformity between the wavelength channels and their separation, and the high degree of out-of-band suppression, are achieved through the functional nature of the modulation of the refractive index amplitude profile and phase profile in the fibre, which conforms, in Examples 4 to 6, to a sinc function. It will be appreciated that other functional forms may be used and selected according to their Fourier properties for the application concerned, for example pulse shaping or filtering. In particular, a combination of non-evenly spaced frequencies may be used as the basis for the envelope function, which will then give non-evenly spaced channels in the response of the grating. In the above Examples, however, the sinc function is used since the Fourier transform of a sinc function is a square pulse and this provides particular properties desirable for WDM dispersion compensation.

The specific examples show how it is possible to provide equal dispersion characteristics on a number of wavelength channels. In addition, the use of chirped gratings, as in Examples 4 to 6, greatly simplifies the dispersion and wavelength matching of gratings where very accurate wavelength separations are required, as is the case for implementation of a large number of grating-based devices, such as dispersion compensators, in the same WDM link.

The channel spacing can be matched in a straightforward manner to any normal wavelength separation, for example those defined by the International Telecommunications Union (ITU) specifications.

Applications of chirped multi-channel gratings embodying the invention in a transmitter unit, a repeater unit and a receiver unit of a long haul fibre transmission system are now described with reference to FIGS. 20, 21 and 22 respectively.

Figure 20:
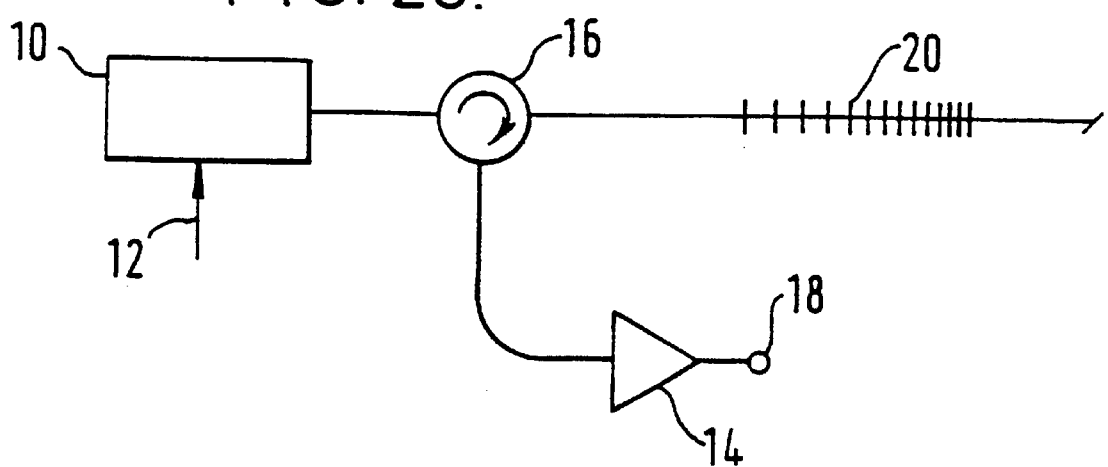
FIG. 20 shows schematically a transmission unit comprising a multi-channel chirped grating according to the first or second embodiments of the invention serving as a WDM dispersion pre-compensator.

FIG. 20 shows a transmitter unit for launching a WDM signal into an optical fibre. The transmitter unit has a conventional electro-optic converter unit 10 which has an input 12 for receiving an electrical data bearing signal. The converter unit 10 may for example be based on a semiconductor laser source (not shown) and an optical modulator (not shown) via which the electrical signal is impressed on the laser output in a conventional manner. The converter unit has an output connected to a circulator 16 having two further connections, one to an erbium-doped fibre amplifier (EDFA) 14, serving as a power amplifier on the output side of the transmitter unit, and another to a chirped multi-channel fibre grating 20 embodying the invention. The circulator 16 is arranged so as to transmit a signal received from the converter unit 10 to the grating 20 and to transmit a signal received from the grating 20 to the EDFA 14. The output side of the EDFA 14 leads to a terminal 18 for connection to one end of a long haul fibre link (not shown). The chirped multi-channel fibre grating 20 serves as a dispersion pre-compensator to offset partially or fully for dispersion induced distortion of the signal for a pre-specified length of fibre of a particular type.

Figure 21:
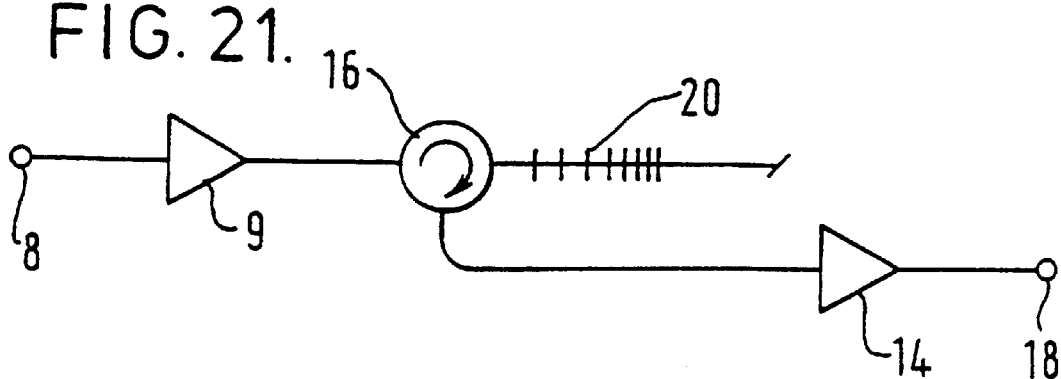
FIG. 21 shows schematically a repeater unit comprising a multi-channel chirped grating accord to the first or second embodiments of the invention serving as a WDM dispersion compensator.

FIG. 21 shows a fibre-amplifier based repeater unit for a WDM transmission system. The repeater unit has an input 8 on the upstream side of the transmission link and an output 18 on the downstream side of the transmission link. The repeater unit is provided with input side and output side EDFA units, 9 and 14 respectively. The input side EDFA unit 9 is arranged to receive the WDM signal from the transmission link via the input 8 and to amplify the signal, for example with wavelength channel selective gain, as is known in the art. The output from the input side EDFA 9 is supplied to an input of a circulator 16 which has two further connections, namely one to a chirped multi-channel fibre grating 20 and another to an input of the output side EDFA 14. The circulator 16 is arranged so as to transmit a signal received from the input side EDFA unit 9 to the grating 20 and to transmit a signal received from the grating 20 to the output side EDFA unit 14. The chirped multi-channel fibre grating 20 serves as an in-line dispersion compensator, or combined (post-)compensator and pre-compensator, and is designed to provide an amount of compensation to offset fully, or more than fully, for dispersion of the signal in the preceding upstream fibre link from the previous repeater unit or transmitter unit.

Figure 22:
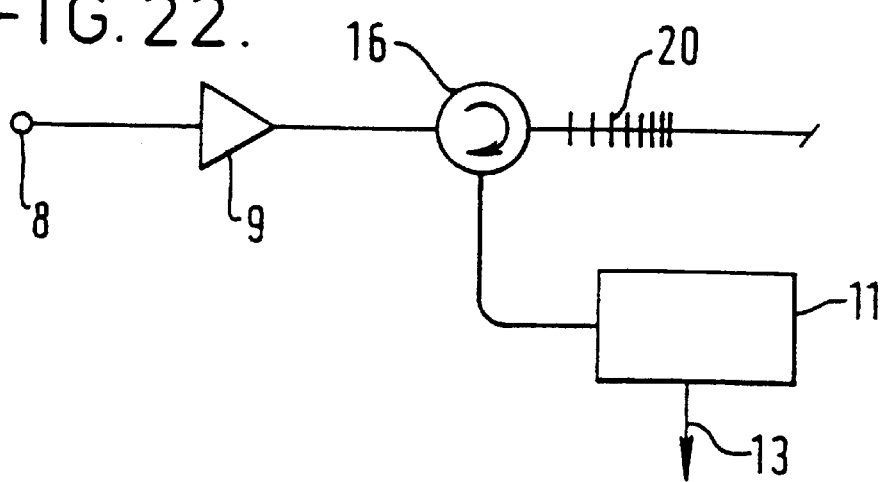
FIG. 22 shows schematically a receiver unit comprising a multi-channel chirped grating according to any one of the first to third embodiments of the invention serving as a WDM dispersion post-compensator.

FIG. 22 shows a receiver unit for opto-electronically converting a WDM signal received from an optical fibre link into corresponding electrical signals. The receiver unit has an input 8 for receiving the WDM signal from an optical fibre link. The input 8 is connected to an EDFA unit 9 which may be of a similar design to the input side EDFA unit described above with reference to the repeater unit. The EDFA unit 9 is connected on its output side to a circulator 16 having two further connections, namely to a chirped multi-channel fibre grating 20 and to an opto-electronic converter unit 11. The circulator 16 is arranged so as to transmit a signal received from the EDFA unit 9 to the grating 20 and to transmit a signal received from the grating 20 to the converter unit 11. The chirped multi-channel fibre grating 20 serves as a dispersion (post-)compensator and is designed to provide an amount of compensation to offset fully for an expected amount of dispersion in the input signal received from the preceding upstream fibre link.

As will be appreciated, there may be provided a uni-directional transmission system comprising a transmitter unit according to FIG. 20, one or more repeater units according to FIG. 21 and a receiver unit according to FIG. 22, each unit interconnected by an optical fibre link. Moreover, a bi-directional transmission system comprising two such uni-directional transmission systems arranged in opposed senses may also be provided.

What is claimed is:

1. An optical fibre waveguide a section of which is modulated in refractive index so as to form a grating with a plurality of characteristic reflection wavelength channels, in which the refractive index modulation comprises an amplitude modulation having:

an underlying higher frequency component defining the shape of the reflection profile of each of the wavelength channels;

a lower frequency component imposing repeated envelopes over the higher frequency component and defining the separation of the wavelength channels, the envelope shape of the lower frequency component being such as to impart a substantially even response to each of the wavelength channels and to limit the plurality of wavelength channels to a finite number thereof; and discrete substantially pi phase shifts at least between the envelopes of the lower frequency component.

2. A waveguide according to claim 1, in which the lower frequency component conforms to a sinc-function.

3. A waveguide according to claim 2, in which the higher frequency component has a substantially constant frequency along the length of the modulated section.

4. A waveguide according to claim 2, in which the higher frequency component has a frequency varying along the modulated section to define a chirped grating.

5. A waveguide according to claim 1, in which the higher frequency component has a substantially constant frequency along the length of the modulated section.

6. A waveguide according to claim 1, in which the higher frequency component has a frequency varying along the modulated section to define a chirped grating.

7. A waveguide according to claim 1, in which the finite number of wavelength channels is one of: 2, 4, 8 and 16.

8. A waveguide according to claim 1, the waveguide having a core region and a cladding region, the modulated section being defined in at least a portion of the core region.

* * * * *